Figure 1:
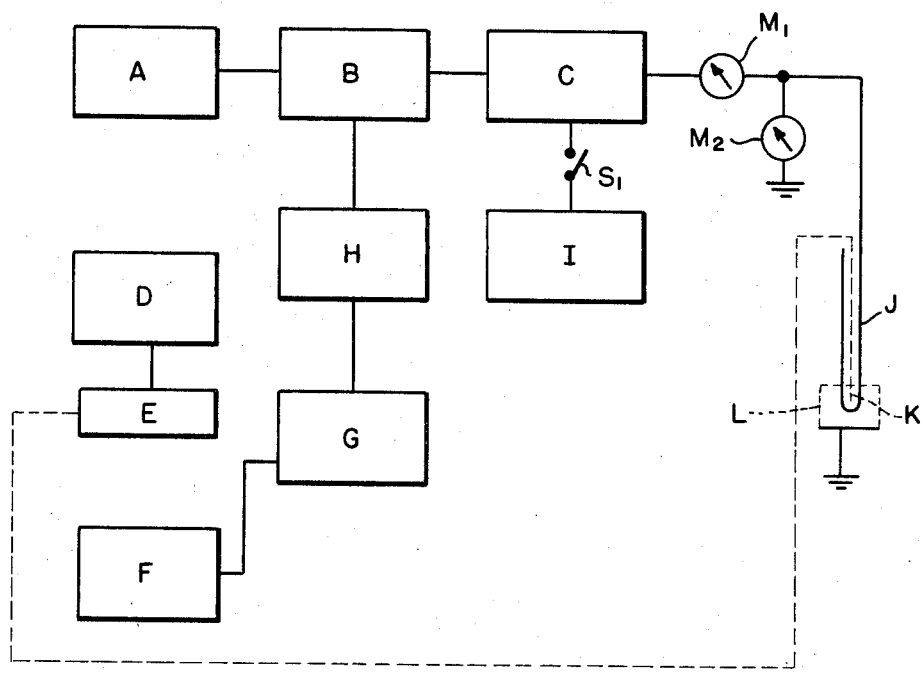

United States Patent

[11] 3,634,652

[72] Inventors: Tetsuji Shimizu, Nagoya City, Aichi Prefecture; Hajime Sumida, Nagoya City; Sinichi Ueno; Susumu Usami, both of Nagoya City, Aichi Prefecture; Sinzi Tatematu, Aichi Prefecture, all of Japan
[21] Appl. No.: 851,314
[22] Filed: Aug. 19, 1969
[45] Patented: Jan. 11, 1972
[73] Assignee: Kabushiki Kaisha Tokai Rika Denki Seisakusho, Nishikasugai-gun, Aichi Prefecture, Japan
[32] Priority: Aug. 20, 1968
[33] Japan
[31] 43/71167

[54] AUTOMATIC TEMPERATURE CONTROL CIRCUIT IN A HIGH-FREQUENCY HEATING APPARATUS
7 Claims, 5 Drawing Figs.

[52] U.S. Cl. .................................................. 219/497, 128/303.18
[51] Int. Cl. .................................................. H05b 1/02
[50] Field of Search .................................... 219/497; 128/303.18

[56] References Cited

UNITED STATES PATENTS

| 187,301 | 2/1877 | Paquelin | 128/303.18 |
| 874,178 | 12/1907 | DeForest | 128/303.18 |
| 1,948,075 | 2/1934 | Miyaoka | 128/303.18 |
| 3,474,258 | 10/1969 | Nagy | 219/497 |

Primary Examiner—Bernard A. Gilheany
Assistant Examiner—F. E. Bell
Attorney—Shlesinger, Fitzsimmons & Shlesinger ABSTRACT: An automatic temperature control circuit in a high-frequency heating apparatus comprising a differential amplifier circuit receiving at one of its input terminals signals from a temperature-setting voltage circuit and at another input terminal signals from a thermister provided with a heating needle which contacts with a load to be heated and amplifying the difference between said two signals, and a voltage control circuit taking said amplified difference of signals and controlling a power voltage in a high-frequency amplitude control circuit. A high-frequency power amplifier circuit in the heating apparatus is thereby controlled so that the temperature of the heating needle at its contact point with the load can be kept under a predetermined degree of temperature.

PATENTED JAN 11 1972

3,634,652

SHEET 1 OF 3

INVENTORS
TETSUJI SHIMIZU
HAJIME SUMIDA
SINICHI UENO
SUSUMU USAMI
SINZI TATEMATU

BY

ATTORNEY

AUTOMATIC TEMPERATURE CONTROL CIRCUIT IN A HIGH-FREQUENCY HEATING APPARATUS

This invention relates to an automatic temperature control circuit in a high-frequency heating apparatus. More particularly, it relates to an automatic temperature control circuit in a high-frequency heating apparatus for medicinal treatment, in which the temperature of loads such as protein having extremely small capacity and different impedances is automatically controlled.

In a conventional high-frequency heating apparatus, the output of which differs in accordance with the impedance of loads, the thermal capacity of which differs also in accordance with each load and in which the temperature of loads differs by disturbance, it is nearly impossible to keep the temperature of loads at a predetermined degree.

The present invention is utilizable as a completely automatically thermocontrol apparatus for an operation on cerebrum in which a heating needle electrode is inserted into the diseased part of cerebral cells to supply a high-frequency electric power into said diseased part whereby the diseased cerebral cell is coagulated by the action of the produced Joule heat, characterized in that the temperature of the pointed end of the heating needle is automatically controlled.

There has heretofore been proposed an apparatus for supplying to a heating needle a high-frequency electric current generated by a high-frequency oscillator and amplified by an electric power amplifier circuit, in which a heat-sensitive element such as thermocouple is inserted in a pointed end of the heating needle so that the temperature of heating can be detected. In such conventional apparatus, however, the control of the supply of high-frequency electric power for maintaining the temperature in a determined range is effected in such manner as by automatic operation to set power "on" and "off" or by simple manual operation. For this reason, the temperature of heating often tends to rise to an undesirable high degree, or it is difficult to maintain the temperature for coagulation at a predetermined degree, so that there is a danger of singeing the cerebral cells near the end of the heating needle by the action of undesirably high temperature whereby the sound cells are destroyed.

In view of the above, the principal object of the present invention is to provide an automatic temperature control circuit for a high-frequency heating apparatus, in which in spite of the simplicity its circuit has, the temperature of loads can be kept closely to a predetermined degree, regardless to the variation of impedance of loads, difference of thermal capacity of loads and disturbance.

It is another object of the present invention to provide an automatic temperature control circuit in a high-frequency heating apparatus, which though the range of proportional band is considerably narrowed as compared to that of a conventional control circuit of the kind, is capable of extremely minimizing any offset, hunting and overshooting.

It is further another object of the present invention to provide an apparatus for operation on the cerebrum, in which the voltage, corresponding to the temperature for coagulation, which is detected by means of a heat-sensitive element, is compared with the voltage corresponding to a determined temperature which rises nonintermittently in a temperature determining circuit, and the high-frequency electric power, proportional to the comparative differential voltage, is supplied into a diseased part while slowly increasing the voltage to a degree at which the determined temperature is obtained and then automatically maintaining the temperature.

The working principle automatic temperature control circuit of the present invention is that in a high-frequency heating apparatus having a temperature detecting thermistor at a heating member for heating loads, there is provided a differential amplifier circuit provided with an input terminal receiving signals given by a temperature-setting voltage circuit, which gradually increases according to the characteristic charging curve of a condenser, and an input terminal receiving signals developed by said thermistor, whereby the signals are differentially amplified to adjust the voltage of an electric source of a high-frequency amplitude control circuit through a voltage control circuit and thereby control a high-frequency power amplification circuit.

Figure 3:
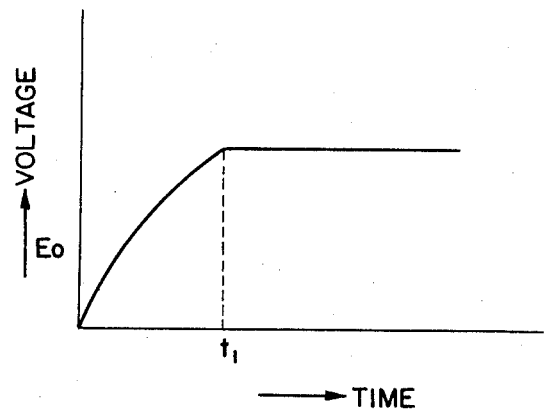
Figure 2:
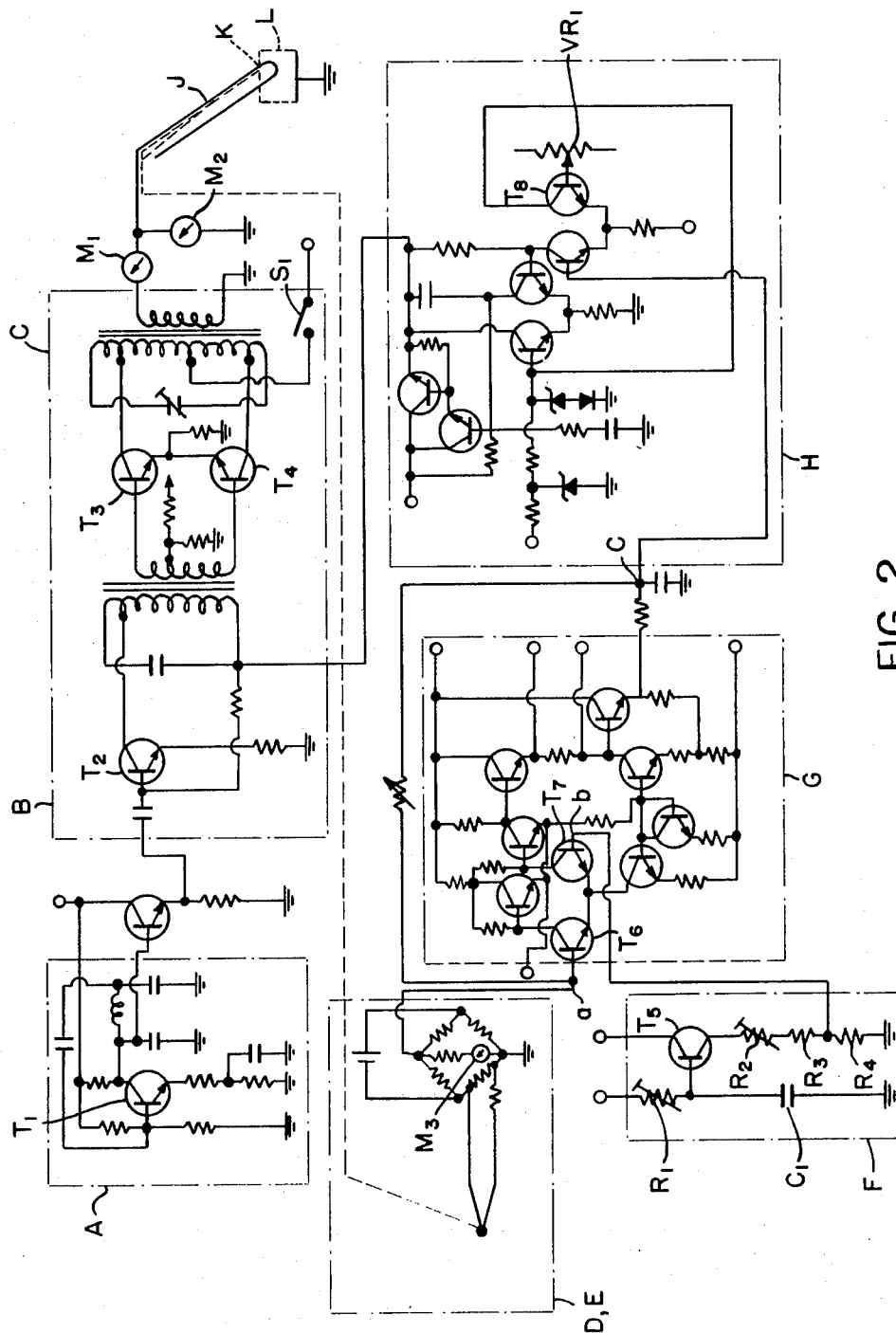
Figure 4:
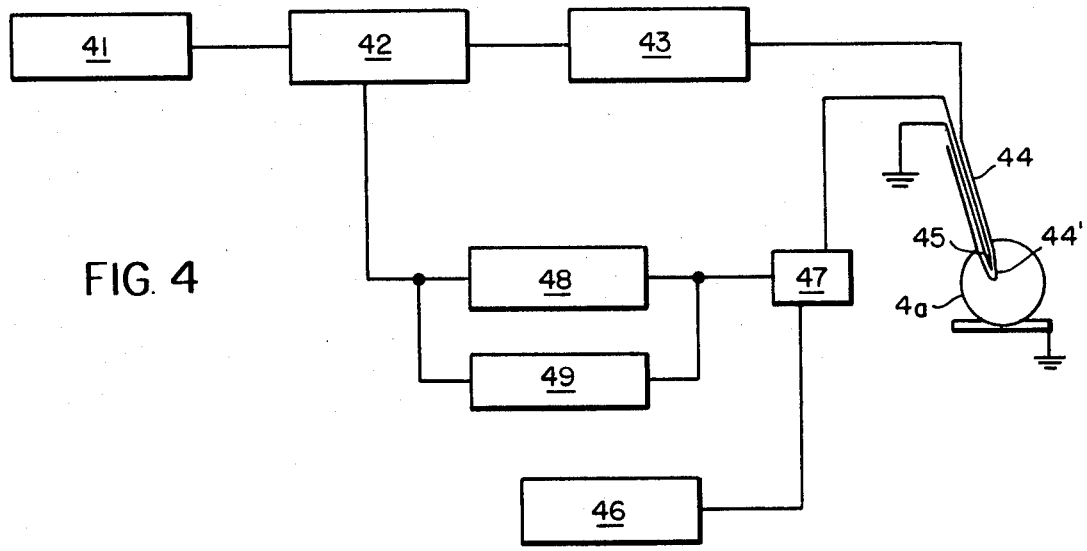
Figure 5:
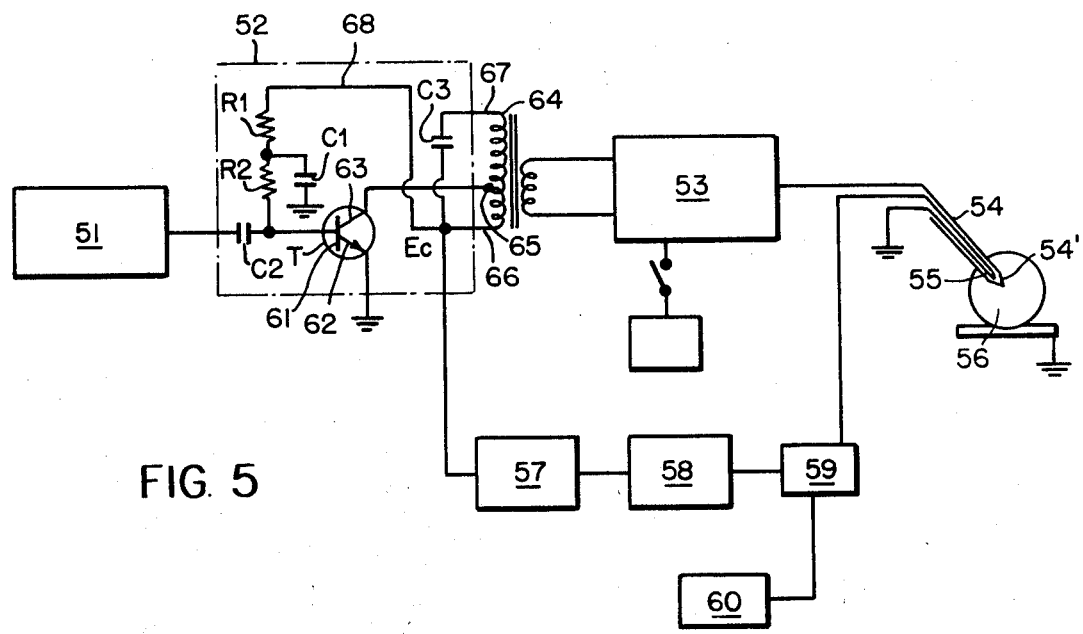

In the accompanying drawing in which some embodiments of the present invention are illustrated;

FIG. 1 is a block diagram of an automatic temperature control circuit of the present invention for use with a high-frequency heating apparatus, FIG. 2 is an electric circuit diagram thereof, FIG. 3 is a diagram showing a charging curve of a condenser in a temperature-setting circuit made under a predetermined program, FIG. 4 is a diagrammatic view of connected circuits of an apparatus embodying the present invention control circuit, and FIG. 5 shows, similarly to FIG. 4, a diagrammatic view of connected circuits of another apparatus embodying the present invention control circuit.

Firstly, the present invention will be explained in detail with reference to FIGS. 1, 2 and 3.

A indicates a Colpitts high-frequency oscillating circuit with a transistor $T_1$ which oscillates stable sine waves. A high-frequency amplitude control circuit B having a transistor $T_2$ load of which is a tuning circuit of the sine waves of the circuit A can alter its output amplitude up to the limits 0–6 v. by changing the power voltage given to the collector of said transistor $T_2$ within the limits of 0–20 v. As the base bias current of the transistor $T_2$ flows to its base from the power source to the collector through a high resistance, said current changes concurrently when the collector voltage changes. Hence, when the base current is changed in accordance with the change of the power voltage given to the collector, it is possible to change said current substantially linearly without deforming it.

C indicates a push-pull high-frequency power amplifier circuit with transistors $T_3$ and $T_4$. To the bases of the transistors $T_3$ and $T_4$ input signals having a phase difference of 180 degrees with each other are applied and appear in an output tuning circuit or a tank circuit after being amplified. $M_1$ indicates a high-frequency ammeter and $M_2$ a high-frequency volt meter.

D and E indicate a temperature indicator mounted with a meter relay and a thermistor bridge provided at its sides with resistors made of manganese, such as the type sold, for example, under the trade name "Manganin," and having a low-temperature coefficient. The change of resistance of said thermistor bridge in relation to temperature is converted into the change of voltage and indicated by a meter $M_3$ of the temperature indicator D. The meter relay provided in the temperature indicator D acts when temperature reaches a predetermined degree. F indicates a temperature setting voltage circuit which is set under a program. It comprises an emitter follower circuit with a transistor $T_5$. In consequence of power being applied, a condenser $C_1$ starts to be charged at a voltage higher than the collector voltage $E_0$ of the transistor $T_5$ through a resistor $R_1$, the voltage at the both ends of the condenser $C_1$ increases in accordance with a charging curve shown in FIG. 3 and the voltage at the emitter terminal of the transistor $T_5$ also increases in proportion to the increase of voltage at its base until said transistor $T_5$ is saturated. The emitter voltage is divided by resistors $R_2$, $R_3$ and $R_4$ so that it shall be a set voltage. The time of reaching of the charging curve of the condenser $C_1$ to the voltage $E_0$, that is, the emitter voltage when the transistor $T_5$ is saturated can be varied by the resistor $R_1$. In other words, the temperature to be set is determined by the formula $$\frac{R_4 E_0}{R_2 + R_3 + R_4}$$

A temperature can be set at any desired degree by varying $R_2$, and the time required to reach the set temperature is determined by $R_1$. A differential amplifier circuit G comprises a transistor $T_8$ having an input base terminal $a$ connected to the output terminal of the thermistor bridge E and another transistor $T_7$ having an input base terminal $b$ connected to the output of the temperature setting voltage circuit F. At the output terminal $c$ of said differential amplifier circuit G, a voltage differentially amplified of the inputs at $a$ and $b$ is obtainable. The phase of said current is contradictory to that of the input $a$ and same to that of the input $b$. A differential type voltage control circuit H changes its output voltage in accordance with signals from the differential amplifier circuit G. It shall be noted that the balance of circuit is obtainable by changing the base voltage of this the transistor $T_8$ without being influenced by the variation of voltage at the circuit's electric source. I indicates an electric source for the amplification of high-frequency, though this member is not in FIG. 2. $S_1$ indicates a switch for the electric source. A heating needle J comprises a pipe closed at its free forward end and having a thermistor K mounted inside the pipe and insulated therefrom. The temperature at the forward end of the heating needle is converted into an electric resistance by said thermistor K and indicated by the meter $M_3$ of the temperature indicator D. L indicates a load to be heated by a high-frequency heating apparatus.

The operation of the present invention of an automatic temperature control circuit having the above constructions is explained hereunder. When a high-frequency current flows by a route of the high-frequency oscillator circuit A, the high-frequency amplitude control circuit B, the high-frequency power amplifier circuit C, the heating needle J, the load L and its earth connection, heat is produced in the forward end of the heating needle J. This heat and its variation are detected by the thermistor K and converted into an electric voltage by the thermistor bridge E to give the corresponding input to the differential amplifier circuit G. This differential amplifier circuit has the two input terminals $a$ and $b$. To wit, to the one of the terminals $a$ there is connected the thermistor bridge E and to the other terminal $b$ there is connected the programmed temperature-setting voltage circuit F. At the output terminal $c$, the difference of signals from the circuits E and F as amplified by the amplifier circuit G is obtained. When the signal given to the input terminal $a$ is larger than that given to the input terminal $b$, the signal obtained at the output terminal $c$ becomes negative. On the contrary, when the former is smaller than the latter, the signal at the output terminal is positive. Since as above described, the collector power voltage of transistor $T_2$ in the high-frequency amplitude control circuit is changed from nil to a positive value by a signal which varies from negative to positive and the input power to the high-frequency power amplifier circuit is to be adjusted thereby, the input power to the voltage control circuit is also to be of a differential type. That is the balance of the circuit is maintained by using a signal from the output terminal $c$ of the differential amplifier circuit G as an input power at one of the input terminals and a variable resistor $VR_1$ at another input terminal. When the collector power voltage of the transistor $T_2$ in the high-frequency amplitude control circuit B changes, the input power to the high-frequency amplifier circuit c changes accordingly and the output power thereof also changes resulting in changing the high-frequency power given to the heating needle J an subsequently changing the temperature of the forward end of needle heated by said power. The variation of temperature of the heating needle at its forward end is detected by the thermistor K, whereby a temperature is controlled to a predetermined degree by the programmed temperature-setting voltage circuit F. Stated illustratively, the output of the temperature-setting voltage circuit is obtained by charging the condenser $C_1$ through the resistor $R_1$ at a voltage higher than the collector voltage. The charging characteristic curve is composed, as shown in FIG. 3, of a curved part gradually increasing and a horizontal linear part. The time constant of the curved part is determined to be large enough, as compared with a delay in the controlling system, to raise the temperature of the tip end of the heating needle according to the charging characteristic curve, and within the range of the proportional band. Accordingly, the control is effected to avoid possible offset, overshooting or hunting, notwithstanding the narrowed range of proportional band.

Referring now to FIG. 4 which illustrates a completely automatically thermocontrol apparatus embodying the present invention for an operation on cerebrum by high-frequency heat-coagulation, numeral 41 designates a high-frequency oscillating circuit to which an output voltage control circuit 42 is connected. An electric power amplifier circuit 43 has an output end connected to an end electrode 44' of a heating needle 44. The end electrode 44' contains a heat-sensitive element 45 comprising a thermocouple. Numeral 46 designates a temperature-determining circuit. The voltage output ends of both the heat-sensitive element 45 and the temperature-determining circuit 46 are connected to a comparing circuit 47 in which the voltages are compared with each other. The differential voltage given by comparison in the comparing circuit 47 is amplified by a DC amplifier circuit 48 which is connected to the circuit 47. Numeral 49 designates a feedback circuit of the amplifier circuit 48 of which the output end is connected to the voltage amplification control circuit 42.

In the apparatus of this invention, a high-frequency output generated in the high-frequency oscillating circuit 41 and having generally a frequency of 300 kc. is supplied to the electric power amplifier circuit 43 after being controlled by means of the output control circuit 42, and then supplied into a diseased part (4a) through the electrode of the heating needle 44. The Joule heat produced by the high-frequency electric power is sharply sensed by the heat-sensitive element 45 and then applied as a voltage to the comparing circuit 47. On the other hand, the voltage proportional to a determined temperature which rises nonintermittently in the temperature-determining circuit is put to the comparing circuit 47. Thus, both the voltages are compared with each other, and then the differential voltage is put from the output end to the DC amplifier circuit 48. The direct current amplified by the circuit 48 acts on the output control circuit 42, so that the high-frequency output generated in the high-frequency oscillator 41 is controlled and the output of the electric power amplifier circuit 43 is increased or decreased in proportion to the amplified output of the DC amplifier circuit 48.

Owing to the manner as stated above, at the time immediately after the heating needle 44 is inserted into the diseased part (4a), the differential voltage obtained by the operation of the comparing circuit 47 is large and therefore the value of the voltage which is applied to the output voltage control circuit 42 through the DC amplifier circuit 48 is high. The output of the high-frequency oscillating circuit 41 also becomes high in proportion to the above-mentioned value of current. Accordingly, the output of the electric power amplifier circuit 43 is large, and the value of the high-frequency electric power supplied into the diseased part by means of the heating needle is high whereby the temperature for heating is relatively rapidly elevated. However, as the temperature comes near a determined degree, the voltage from the heat-sensitive element becomes high. As a result, the differential voltage given by the comparison in the comparing circuit 47 becomes low, so that the electric current put to the output voltage amplifier circuit 42 is reduced and, therefore, the cycling action of reducing the high-frequency electric power adapted to be supplied to the electrode 44' of the heating needle 44 occurs. Consequently, the temperature rises extremely slowly toward the determined temperature, whereupon an electric power is completely automatically supplied in an amount sufficient to maintain the determined temperature.

Generally, the coagulation of diseased cerebral cells is effected at a determined temperature of 70° C. On the other hand, it is known that when a provisional coagulation is effected at approximately 42° C., a cell temporarily stops its action, and it will return to its original state in a certain period of time. Therefore, such provisional coagulation is widely utilized as an operation for searching the exact position of diseased part when such position is definitely unknown. In case of such provisional operation, however, there is a danger that if the temperature rises inordinately by chance, the recovery of the cell becomes impossible. In contrast to this, in the apparatus according to the present invention, the temperature comes slowly toward a determined temperature, at which it is automatically maintained without exceeding the determined degree, and, therefore, it is completely free from various drawbacks of the conventional apparatus utilizing the system of setting "on" and "off," such as fluctuation of the temperature of heating, hunting and offset. Thus, it is very easy to operate the apparatus of this invention and, in addition, it is possible to completely automatically control the temperature for provisional coagulation as well as the perpetual coagulation. When using the apparatus of this invention, a doctor can devote himself to an operation without additional care only be setting a determined temperature and switching on the apparatus.

Lastly, referring to FIG. 5 in which another embodiment of the present invention is diagrammatically illustrated, the numeral 51 indicates a high-frequency oscillator circuit, 52 a high-frequency voltage control circuit which makes a principal part of the present invention temperature control device and 53 a power amplifier circuit which is coupled by a transformer to the oscillator circuit 51 controlled by said control circuit 52, and which has its output terminal is connected to an electrode 54' of a heating needle 54. A heat-sensitive element 55 consisting of a thermoelectric couple mounted inside the electrode and a temperature-setting circuit 60 are connected respectively at their voltage taking out terminals to a comparison circuit 59 in which the voltage given thereto by the heat-sensitive element and the temperature-setting circuit are compared. A DC amplifier circuit 58 connected to said comparison circuit amplifies the deviation of voltage compared by the latter and given to the former. The direct current amplified by the circuit 58 is transmitted to a voltage control circuit 57 which is connected to an output terminal of the high-frequency oscillator circuit 51 to automatically control the high-frequency power to be put out from the power amplifier circuit 53.

Circuit connections in the high-frequency power control circuit 52 are explained in detail hereinunder. The output terminal of high-frequency oscillator circuit 51 is connected to the base of an NPN-type transistor T in a drive stage through a condenser $C_2$, the collector 63 of said transistor is connected to a tap 65 in the primary coil of an output transformer 64 which is provided with a secondary coil in the power amplifier circuit, the emitter 62 of said transistor is connected to ground, terminal 66 of the output transformer 64 is connected through a bias circuit 68 to the base of the resistors T, transistors $R_1$ and $R_2$ are connected in series in the bias circuit; and the positive pole of the condenser $C_1$ is connected to said circuit at a connection between the two resistors. The output terminal of the power control circuit 57 is connected at Ec to the bias circuit 68 through the terminal 66 of the output transformer and to the other terminal 67 of said transformer through a condenser $C_3$.

In the above-described device for automatically controlling the temperature of a load of minor capacity, when the electrode 54' of the heating needle 54 is put against a load 56 such as a cerebrum and a high-frequency power is applied thereto, heat is produced around the load. The voltage in response to the temperature detected by the heat sensitive element 55 mounted inside the electrode 54' is compared in the comparison circuit with the voltage applied thereto in proportion to the temperature determined by the temperature-setting circuit 60 to give the deviation of voltage to the DC amplifier circuit 58. In said circuit 58, the deviation of voltage which decreases in inverse proportion to the elevation of heating temperature is amplified and applied to the voltage control circuit 57. The voltage control circuit controls the power output from the output transformer of the oscillator circuit 51, whereby the volume of high-frequency power applied onto the load by the heating needle 54' is lessened in inverse proportion to the elevation of temperature at the load, viz, the heating temperature is gradually increased to a predetermined degree of temperature.

Since the transistor T is biased to zero in the present control device, when the voltage at the output terminal of the voltage control circuit 57 and the connecting point $E_c$ of the bias circuit 68 suddenly increases by switching on the power amplifier circuit, the condenser $C_1$ is charged through the resistor $R_1$ and the terminal voltage rises, the transistor T starts to operate in consequence with the increase of current flow at the base thereof and the driving output thereof changes from zero to its maximum to increase gradually the high-frequency output.

We claim:

1. An automatic temperature control circuit for high-frequency heating apparatus provided with a pointed member for heating a load at its contact point with the load, and having a thermistor for detecting the temperature at said contact point, which comprises a high-frequency power amplifier having its output connected to said member to effect the heating thereof, a temperature-setting voltage circuit for setting the desired temperature at said contact point, a differential amplifier circuit having one input terminal connected to receive signals from said temperature-setting voltage circuit and another input terminal connected to receive signals from said thermistor and operative to amplify the difference between said signals, and a voltage control circuit for applying the amplified signals from said differential amplifier circuit to the input of said power amplifier to adjust the output voltage of said power amplifier to keep the heating member at its contact point with the load at said desired temperature.

2. A completely automatically thermocontrol apparatus for performing an operation on cerebrum by high-frequency heat-solidification, which comprises a heating needle having an electrode, a high-frequency oscillating circuit, a power amplifier connected to said electrode to supply power thereto for heating said needle, an output voltage control circuit connecting said power amplifier to said oscillating circuit, said electrode being located at a pointed end of said heating needle and having inside thereof a heat-sensitive element, a temperature determining circuit, a comparing circuit, said heat-sensitive element and said temperature determining circuit each having voltage outputs connected to said comparing circuit, and a direct current amplifier circuit for amplifying the comparative differential voltage of said comparing circuit, and having its output connected to said output voltage control circuit, said voltage control circuit being operative to adjust the input to said power amplifier in accordance with the amplitude of said differential voltage, thereby to control the output of said power amplifier in proportion to said differential voltage.

3. An apparatus as claimed in claim 2, which further comprises an output transformer for said high-frequency oscillating circuit having a terminal on one of its coils connected to the output of said voltage control circuit, a transistor interposed between the output terminal of said high-frequency oscillating circuit and said transformer, said transistor being connected at its base to said output terminal, a bias circuit connecting said base with said terminal on said one coil of the output transformer, a pair of resistors connected in series in said bias circuit, and in parallel with a condenser connected at one side between said resistors and at its opposite side to ground.

4. An automatic temperature control circuit in a high-frequency heating apparatus, comprising
a high-frequency oscillator circuit,
an output voltage control circuit connected to an output terminal of said high-frequency oscillator circuit;
an electric power amplifier circuit connected to an output terminal of said output voltage control circuit;
a heating member connected to an output terminal of said electric power amplifier circuit and having a contact point engageable with a load for heating said load,
a heat-sensitive element for detecting the temperature of said contact point,
a temperature-setting circuit for preselecting a desired operating temperature for said heating member, and
a differential amplifier circuit connected to output terminals of said temperature-setting circuit and said heat-sensitive element,
an output terminal of said differential amplifier circuit being connected to said output voltage control circuit to control the output of said high-frequency oscillator circuit.

5. An automatic temperature control circuit in a high-frequency heating apparatus as claimed in claim 4, which further comprises
a high-frequency voltage control circuit having a transistor whose base is connected to said output terminal of said high-frequency oscillator circuit,
an output transformer having a first terminal on one of its coils connected to said transistor and further connected to an output terminal of said output voltage control circuit;
two resistors connected in series between the base of said transistor and the junction of said transformer and said output voltage control circuit, and
a condenser connected to the junction of said two resistors.

6. An automatic temperature control circuit in a high-frequency heating apparatus as claimed in claim 4, wherein said temperature setting circuit has a time constant circuit for gradually increasing the output voltage of said setting circuit according to the charging characteristic curve of a condenser.

7. An automatic temperature control circuit in a high-frequency heating apparatus as claimed in claim 4, wherein said heating member is a heating needle for an operation on the cerebrum by high-frequency heat-coagulation.

* * * * *